US009134881B2

(12) United States Patent
Wheeler et al.

(10) Patent No.: US 9,134,881 B2
(45) Date of Patent: Sep. 15, 2015

(54) GRAPHICAL INPUT DISPLAY HAVING A CAROUSEL OF CHARACTERS TO FACILITATE CHARACTER INPUT

(71) Applicant: Google Inc., Mountain View, CA (US)

(72) Inventors: Aaron Joseph Wheeler, San Francisco, CA (US); Luke Bayes, San Francisco, CA (US); Marc Layne Hemeon, Mountain View, CA (US); Matias Cudich, San Francisco, CA (US); Allan Stephan Mills, San Francisco, CA (US); Tyler Wesley Breisch, San Francisco, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/784,004

(22) Filed: Mar. 4, 2013

(65) Prior Publication Data
US 2014/0250405 A1 Sep. 4, 2014

(51) Int. Cl.
*G06F 3/0482* (2013.01)
*G06F 17/27* (2006.01)
*G06F 3/023* (2006.01)

(52) U.S. Cl.
CPC ............ *G06F 3/0482* (2013.01); *G06F 3/0236* (2013.01); *G06F 3/0237* (2013.01); *G06F 17/276* (2013.01); *H04M 2250/70* (2013.01)

(58) Field of Classification Search
CPC ... G06F 3/0237; G06F 3/0481; G06F 17/243; G06F 17/274; G06F 3/0482
USPC .......................................................... 715/780
See application file for complete search history.

(56) References Cited

U.S. PATENT DOCUMENTS

| 6,011,542 | A | 1/2000 | Durrani et al. |
| 6,710,771 | B1 * | 3/2004 | Yamaguchi et al. .......... 345/184 |
| 7,860,536 | B2 * | 12/2010 | Jobs et al. ..................... 455/566 |
| 8,223,127 | B2 | 7/2012 | Park et al. |
| 8,495,732 | B2 * | 7/2013 | Guenthner ....................... 726/22 |
| 8,584,051 | B1 * | 11/2013 | Alfaro et al. ................... 715/864 |
| 8,589,808 | B1 * | 11/2013 | Alfaro et al. ................... 715/753 |

(Continued)

FOREIGN PATENT DOCUMENTS

| WO | 2011004292 | 1/2011 |
| WO | 2011110823 | 9/2011 |
| WO | 2012038742 | 3/2012 |

OTHER PUBLICATIONS

International Search Report and Written Opinion for International Patent Application Serial No. PCT/US2014/020031, dated Jun. 3, 2014, 11 pages.

*Primary Examiner* — David Phantana Angkool
(74) *Attorney, Agent, or Firm* — Amin, Turocy & Watson, LLP

(57) ABSTRACT

Systems and methods for facilitating character input using a graphical input display having a carousel of characters are provided. In an aspect, a system includes an interface component configured to generate a carousel graphical input display, the carousel graphical input display comprising a plurality of characters arranged in a fixed line, wherein a cursor is configured to move over the characters about the line and the cursor shifts from a first end of the line to a second end of the line in response to reaching either the first end of the line or the second end of the line. The system further includes an input component configured to receive a command to move the cursor over the characters to focus on respective ones of the characters.

22 Claims, 15 Drawing Sheets

(56) References Cited

U.S. PATENT DOCUMENTS

| | | | |
|---|---|---|---|
| D714,813 S * | 10/2014 | Oda et al. | D14/485 |
| 2005/0081164 A1 * | 4/2005 | Hama et al. | 715/830 |
| 2011/0209074 A1 | 8/2011 | Gill et al. | |
| 2013/0185642 A1 * | 7/2013 | Gammons | 715/733 |
| 2014/0250405 A1 * | 9/2014 | Wheeler et al. | 715/780 |
| 2014/0256409 A1 * | 9/2014 | Wood et al. | 463/25 |
| 2015/0029090 A1 * | 1/2015 | Kim et al. | 345/156 |

* cited by examiner

GRAPHICAL INPUT DISPLAY HAVING A CAROUSEL OF CHARACTERS TO FACILITATE CHARACTER INPUT

TECHNICAL FIELD

This disclosure relates system(s) and method(s) that facilitate character input using a graphical input display having a carousel of characters.

BACKGROUND

Various computer systems requires character input by a user. Depending on the input device used, character input to a graphical user interface can become tedious. For example, conventional graphical character input displays consist of characters arranged in a keyboard fashion on a display screen. When interacting with such character input displays using a basic controller, a user must navigate the graphical keyboard display using multidirectional and non-uniform navigation paths. Such input mechanisms are inefficient and frustrating for the user.

DETAILED DESCRIPTION

Figure 1:
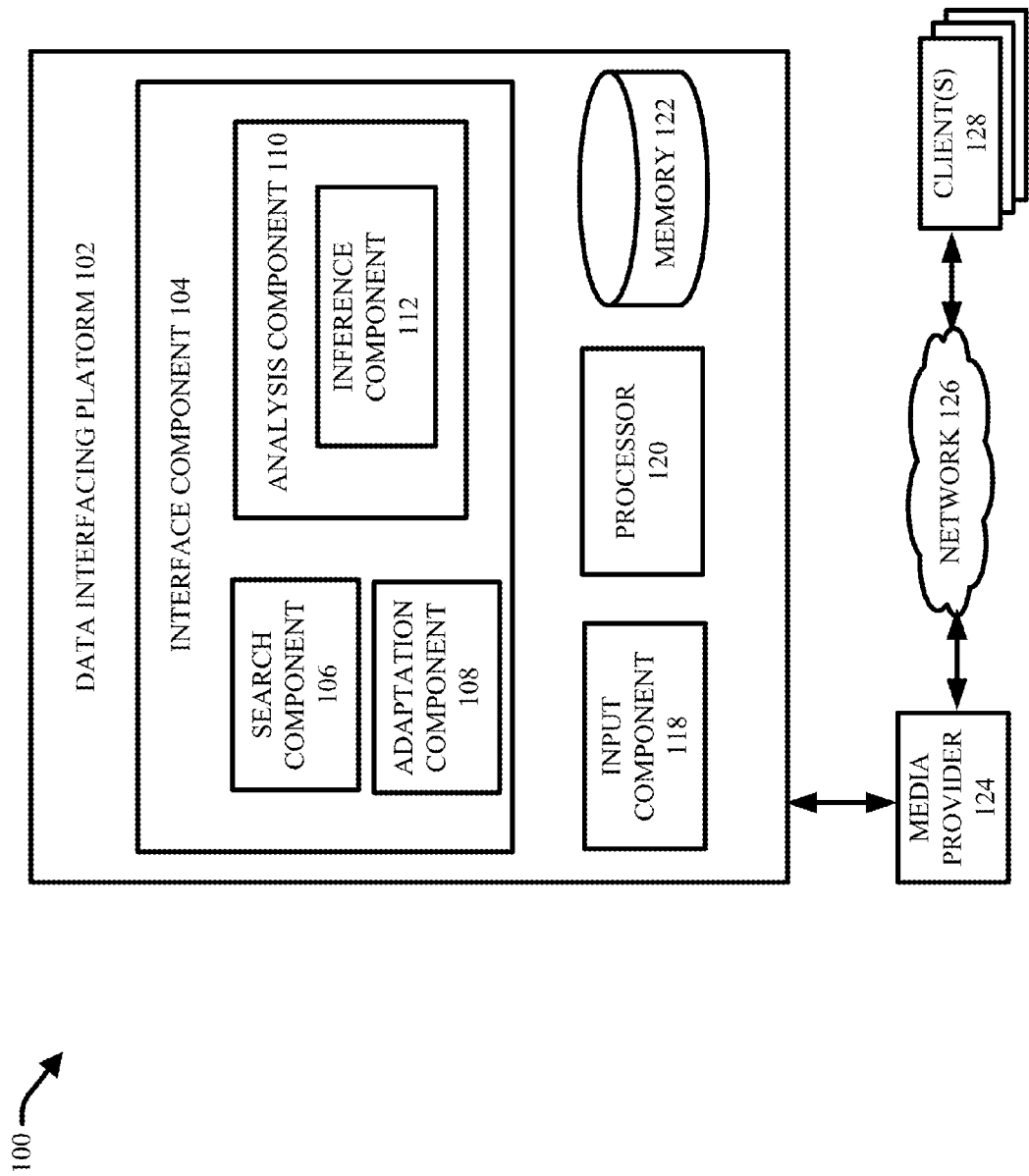
FIG. 1 illustrates a block diagram of an example system that facilitates character input using a graphical input display having a carousel of characters in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods that facilitate character input using a graphical user interface. In accordance with an embodiment, a graphical input display is provided that facilitates input using a basic controller having a direction pad (e.g. a controller having up, down, left, and right buttons) and select and cancel buttons. The graphical input display presents a carousel of characters a user might type. For languages with a Roman alphabet, the characters can include the alphabet letters, numbers, and a space character. The characters can rotate about the carousel to be brought to a focus position or a cursor can rotate about the characters in a carousel fashion to focus on a character. The focused character can be changed, for example, by using the left or right buttons and selected with the enter button. The carousel loops infinitely so that the user can move focus seamlessly from one end to the other.

In an aspect, when a character is selected, a vertical dropdown display of likely candidates for the next character(s) is displayed. In this way, the next character can be selected easily from the drop down without having to scroll through the whole carousel of characters. In an aspect, the vertical dropdown can be navigated by using the up and down button of a direction pad of a controller. In an aspect, the characters are arranged in a horizontal line and a cursors circles around the characters seamlessly. The horizontal layout provides space for a search box to appear above the carousel. Selection of a character can result in the typing of the character in the search box and the search box can be continually updated to include the last letter that is selected. In an aspect, after a brief delay, the most common query matching the letters that have been typed can appear greyed out in the search box. In order to change focus from the carousel of characters to the search box, a user can merely push an "up" button on the direction pad of a controller. For example, by pushing an up button, focus shifts to the search box, allowing the user to accept the suggested query. Accepting the search will fill the search box with the query and issue a search.

Referring now to the drawings, with reference initially to FIG. 1, presented is a system 100 having a data interfacing platform 102 that facilitates character input to a graphical user interface. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 122 for storing computer executable components and instructions. System 100 further includes a processor 120 to facilitate operation of the instructions (e.g., computer executable components and instructions) by system 100.

Data interfacing platform 102 is configured to generate a graphical input display that facilitates efficient and accurate character input, particularly using a basic controller (e.g., a controller having basic input keys such as an up/down/left right button, a cancel button and a select button). For example, conventional graphical character input displays consist of characters arranged in a keyboard fashion on a display screen. When interacting with such character input displays using a basic controller, a user must navigate the graphical keyboard display using multidirectional and non-uniform navigation paths. Such input mechanisms are inefficient and frustrating for the user. Data interfacing platform 102 can generate alternative graphical input displays that reduce such deficiencies associated with conventional graphical keyboard input displays and the like. In particular, data interfacing platform 102 can generate a graphical input display having a carousel of characters wherein either a cursor moves around the characters seamlessly to focus on a single one of the characters at a time or the characters circle around an axis seamlessly to bring a single one of the characters to a focus position at a time.

Data interfacing platform 102 can include at least an interface component 104 and an input component 118. The interface component 104 can perform various functions associated with generating a graphical input display with the various features discussed herein and displaying characters and associated words or phrases made up of the characters. The interface component 104 can further include a search component 106, an adaptation component 108, and an analysis component 110.

The input component 118 can facilitate selecting characters for input to a graphical input display generated by the interface component 104. For example, input component 118 is configured to receive commands from an input device (e.g., a controller, a keyboard, a mouse, a touch screen, and etc., (not shown)) and interpret those commands to facilitate interaction with a graphical input display generated by interface component 104. In an aspect, the input component 118 can receive a command to rotate characters of a character carousel to bring one of the characters to a focus position. In another aspect, the input component 104 can receive a command to move a cursor about a character carousel to focus on one of the characters. The input component 118 can further receive commands to select characters, select search words and or otherwise select data. The input component 118 can further receive commands to move a cursor or other indicator of a graphical input display about the graphical input display. In response to received commands, the input component can effectuate such input commands. For example, the input component 118 can select characters, select search words or otherwise select data, cause characters to by typed into a search box, delete characters selections, and move a cursor or other indicator about the graphical input display in the manner imparted by a received command.

Interface component 104 is configured to generate various graphical interfaces as exemplified in FIGS. 2-10. These interfaces, unlike conventional keyboard input displays and the like, can include a carousel of characters wherein either a cursor moves around the characters seamlessly to focus on a single one of the characters at a time or the characters circle around an axis seamlessly to bring a single one of the characters to a focus position at a time. The term carousel is used herein to describe an object or arrangement having an element that can rotate about an axis endlessly. The angle of the axis can vary. For example, the axis can include a vertical axis or a horizontal axis. In an aspect, the element is a cursor that rotates around an arrangement of characters such that the cursor loops around the arrangement of characters endlessly. For example, the characters can be arranged in a circle (or other shape without fixed endpoints e.g., an ellipse a square a rectangle, and etc.) and the cursor can loop about the characters around the circle. In another example, the characters can be arranged in a fixed line and the cursor can move over the characters about the line such that the cursor shifts from a first end of the line to a second end of the line in response to reaching either the first end of the line or the second end of the line. Still in yet another aspect, the element that rotates about an axis endlessly is the characters themselves. For example, the characters can be arranged in a circle and the characters can rotate around the circle such that a single character passes through a focus position at a time for selection thereof.

The specific characters of a graphical input display generated by the interface component 104 can vary depending on the purpose of the input display and the language to which the input display is tailored. In particular, the interface component 104 can generate a graphical input display having a carousel of characters for any written language having letters, numbers, and/or symbols. In an aspect, for languages with a Roman alphabet, the characters can include the alphabet letters, numbers, and a space character.

In an aspect, in order to move a cursor/indicator about a graphical character input display generated by the interface component 104, a user can employ an input device that facilitates basic input commands. For example, the input device can provide up and down commands, left and right commands, enter/select commands and/or delete commands. According to this aspect, by selecting the left and right commands, the cursor/indicator can move left or right respectively to focus on a character of a character carousel or the characters of character carousel can move counter-clockwise or clockwise respectively to bring a character of the character carousel to a focus position. It should be appreciated that the interface component 104 can generate a graphical input display configured to be employed by various input devices having various degrees of command capability and complexity. A controller having the basic commands described above is merely one possibility of a suitable controller for use in conjunction with interfaces generated by data interfacing platform 102.

Once a character has been brought to a focus position, a user can select the character by pressing enter/select on the input device. Selection of a character can result in the typing of the character in another area of the graphical input display, such as a search box or other type of textual input area of the graphical input display. In an aspect, upon selection of a character on a character carousel, the interface component 104 can generate a secondary input display orthogonal and/or tangential from the selected character that includes suggested characters or words based the selected character or the selected character and one or more previously selected characters.

For example, a secondary display can include a subset of characters from the character carousel (e.g., one or more characters) that have a high probability of following the selected character when forming a word. According to this example, where a user selects the letter "T," analysis of the English language could indicate that the letters having the highest probability of following the letter "T" when forming words in the English language include "R," "E," "I," and "A." Thus a secondary display generated based on the selection of the letter "T" could include the letters "R, E, I and A." In addition, the interface component 104 can further select a subset of characters for inclusion in a secondary display based on the selected character and one or more previously selected characters. For example, where a user has selected the letter "A" prior to selection of the letter "T," the letters included in the secondary display include letters that have a high probability of following the letter "AT" in word formation.

In another example, a secondary display can include suggested single words that are often formed with a selected letter or combination of selected letters. For example, where a user has selected the letter "S" based on various predetermined algorithms and/or probabilities, likely words that begin with the letter "S" could be included in a secondary display. As a user selects additional letters, the words included in the secondary display can be suggested based on the combined selected letters. For example where a user selects the letter "A" after previously selecting the letter "S," a secondary display generated orthogonal to the letter "A" could include the words often formed starting with the letter combo "SA" (e.g., "San", "Santa", "sail", and "said").

In an aspect, where the character carousel includes a linear arrangement of characters, the secondary arrangement of characters or words can include a scrollable list of suggested characters or words based on the selected character that extends in a direction perpendicular from the linear arrangement of characters with the selected character as a starting point. In this way, a user can scroll through the subset of suggested characters instead of scrolling through the full set of characters from the character carousel, thus enhancing efficiency of accurate character selection.

Upon selection of a suggested character or word from a secondary graphical input display, the suggested character or word is typed in a text box (e.g., search box or other textual input area of the graphical input display) and the secondary graphical input display is dismissed (e.g., deleted or made to disappear). In an aspect, upon selection of a suggested character from a subset of characters in a secondary graphical input display, the interface component 104 automatically updates the character carousel to reflect selection of the suggested character. In particular, interface component 104 can rotate a circular arrangement of characters to cause a version of the selected suggested character to be brought to a focus position of the character carousel or cause the cursor/indicator to move to hover over/focus on a version of the selected suggested character in the character carousel. In an aspect, the interface component 104 can further automatically generate a new secondary graphical input display tangential from the character currently at the focus position having one or more suggested characters based on the character currently at the focus position (e.g., the version of the most recently selected character). In this way, the interface component 104 can continuously present a user with a subset of characters from the character carousel that is based on the previously selected character and/or characters.

In some aspects, although a secondary graphical input display is generated in response to selection of a focused character on the carousel graphical input display, a user may choose not to select one of the suggested characters or words included in the secondary graphical input display. For example, the one or more suggested characters or words may not include the particular character or word desired by the user. At this time, the user can choose to scroll through the original carousel graphical input display to find another character for selection.

In an aspect, when a user returns to scrolling through the original carousel graphical input display after a secondary display is generated, the secondary graphical input display can be dismissed. For example, where the carousel graphical input display comprises a horizontal line of characters and generated secondary display comprises a vertical drop down list of characters, a user can employ left and right buttons of a controller to scroll through the horizontal line of characters and up and down buttons to scroll through a secondary display of suggested characters. In this example, if the user employs the left or right buttons after a secondary display has been generated, the secondary display can be dismissed.

Search component 106 can be employed by the interface component 104 to facilitate generating a search input box, typing selected characters in the search input box, typing suggested words or phrases in the search input box, and providing the typed word or phrase to a search engine for querying thereof. According to this aspect, data interfacing platform 102 can be employed by a system that requires textual input for performance of query search. As noted above, in response to selection of characters from a character carousel generated by interface component 104, the characters are typed into a search text box generated by the search component 106.

In an aspect, the search component 106 can fill the search box with a suggested word or phrase that is based on a typed character or characters and adjacent to the typed character or characters. For example, a user can select a first character that is typed in the search box and the search component 106 can fill the search box with a suggested word or phrase based on the first character. Each time a new character is typed, the search component 106 can update the suggested word or phrase to include a suggested word or phrase based on the collective selected characters. In an aspect, the suggested word or phrase can be displayed in the search box in an optional selection manner. For example, the typed selected characters can be displayed in first color while the remaining characters associated with the suggested word or phrase can be displayed in a second color. According to this example, the selected characters can be darkened while the suggested characters of the word or phrase can be greyed out. In this way, a user can easily distinguish between characters definitively selected by the user and characters suggested by the search component 106. The search component 106 can further present a widget within the search box following a suggested word or phrase that allows for selection of the suggested word or phrase presented in the search box. By selecting the widget, the user can accept the suggested word or phrase for issuance of a query.

Analysis component 110 can provide analytics associated determinations and inferences performed by various components of the data interfacing platform 102. For example, the interface component 104 can employ analysis component 110 to determine or infer one or more letters to include in secondary graphical input display having a subset of suggested characters from a character carousel based on a selected character. In another example, the search component 106 can employ analysis component 110 to determine or infer a suggested word or phrase to present in a search text box based on a character or characters selected and typed in the search box.

The analysis component 110 can employ one or more algorithms and look-up tables stored in memory 122 (or externally) to facilitate making various determinations and inferences regarding suggested characters, words and/or phrases. Such algorithms and/or look-up tables can define various relationships between word formation and characters for a particular language and/or characters, word and/or phrases with words or phrases associated with a search category or set of content available for searching. For example, where data interfacing platform 102 is employed in conjunction with a media database (e.g., stored in memory 122 or externally) having media items identifiable by titles associated with the respective media items, the search component 106 can employ algorithms and/or look-up tables that relate characters, words, and/or phrases with words and/or phrases of the known titles of the items in the database.

In an embodiment, analysis component 110 can include an inference component 112 to facilitate making inferences (e.g. inferring suggested characters, words, or phrases) in connection with facilitating data input. In order to provide for or aid in the numerous inferences described in this disclosure, inference component 112 can examine the entirety or a subset of data to which it is granted access in order to provide for reasoning about event management and planning decisions. Inference component 112 can be granted access to any information associated with system 100 (and additional system described herein), including information received or generated by system 100, information stored in memory 122, as well as accessible extrinsic information accessible to data interfacing platform 102 via a network 126.

Inference component 112 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Adaptation component 108 can be employed by interface component 104 to facilitate tailoring of graphical input displays generated thereby to a client device 128 at which the graphical input displays are presented. A client device 128 can include any suitable device associated with a user and configured to present a graphical user interface via a display screen. For example, a client device can include a television, a desktop computer, a laptop computer, a smart-phone, a tablet personal computer (PC), or a PDA. Adaptation component 108 is configured to tailor the design and presentation of an interface generated by the interface component based at least in part on capabilities and functionalities of the user device 128 at which the interface is displayed. Respective devices often have different capabilities and limitations (e.g., screen size, decoders . . . ). In an aspect, the adaptation component 108 can provide presentation options in accordance with different device capabilities or limitations. For example, data rendering capabilities may be more limited in a mobile device (e.g., a smart-phone) than in a fixed computing device (e.g., a desktop computer) and more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. The adaptation component 108 can thus optimize display of options and content for respective devices.

Data interfacing platform 102 can be employed by various systems as a tool for generating an efficient graphical user interface for data input with input devices ranging in complexity (e.g., basic controllers to more complex input devices). By way of example, FIG. 1 presents data interfacing platform 102 for use in conjunction with a streaming media system 100. For example, system 100 can include one or more media providers 124 configured to provide media items, such as streaming video, streaming music, and/or streaming television to a client device via a network 126. In this respect, data interfacing platform 102 can generate an interface for character input in association with searching for media items provided by the one or more media provider 124 for viewing thereof.

In an aspect, a media provider 124 can serve as media distributor and includes a streaming component that streams media to the one or more clients 128. According to this aspect, the media can include media stored by the media provider 124 and/or stored at an external source accessible to media provider 124 via a network 126. As used in this disclosure, the terms "content consumer" or "user" refers to a person, entity, system, or combination thereof that employs system 100 (or additional systems described in this disclosure). In an aspect, a client device 128 (or additional systems/component described in this disclosure) can be configured to access a media provider 124 and receive streamed media via network 126. (e.g., the Internet). Network 126 can include but is not limited to a cellular network, a wide area network (WAD, e.g., the Internet), or a local area network (LAN). For example, a client 128 can communicate with a media provider 124 using virtually any desired wired or wireless technology, including, for example, cellular, WAN, wireless fidelity (Wi-Fi), WiMax, WLAN, and etc.

FIGS. 2-10 present various graphical user interfaces capable of being generated by data interfacing platform 102 in association with a streaming media system, such as system 100, merely for exemplary purposes. However, it should be appreciated that data interfacing platform 102 can be used for generating character input interfaces with various types of systems that require character input.

Figure 2:
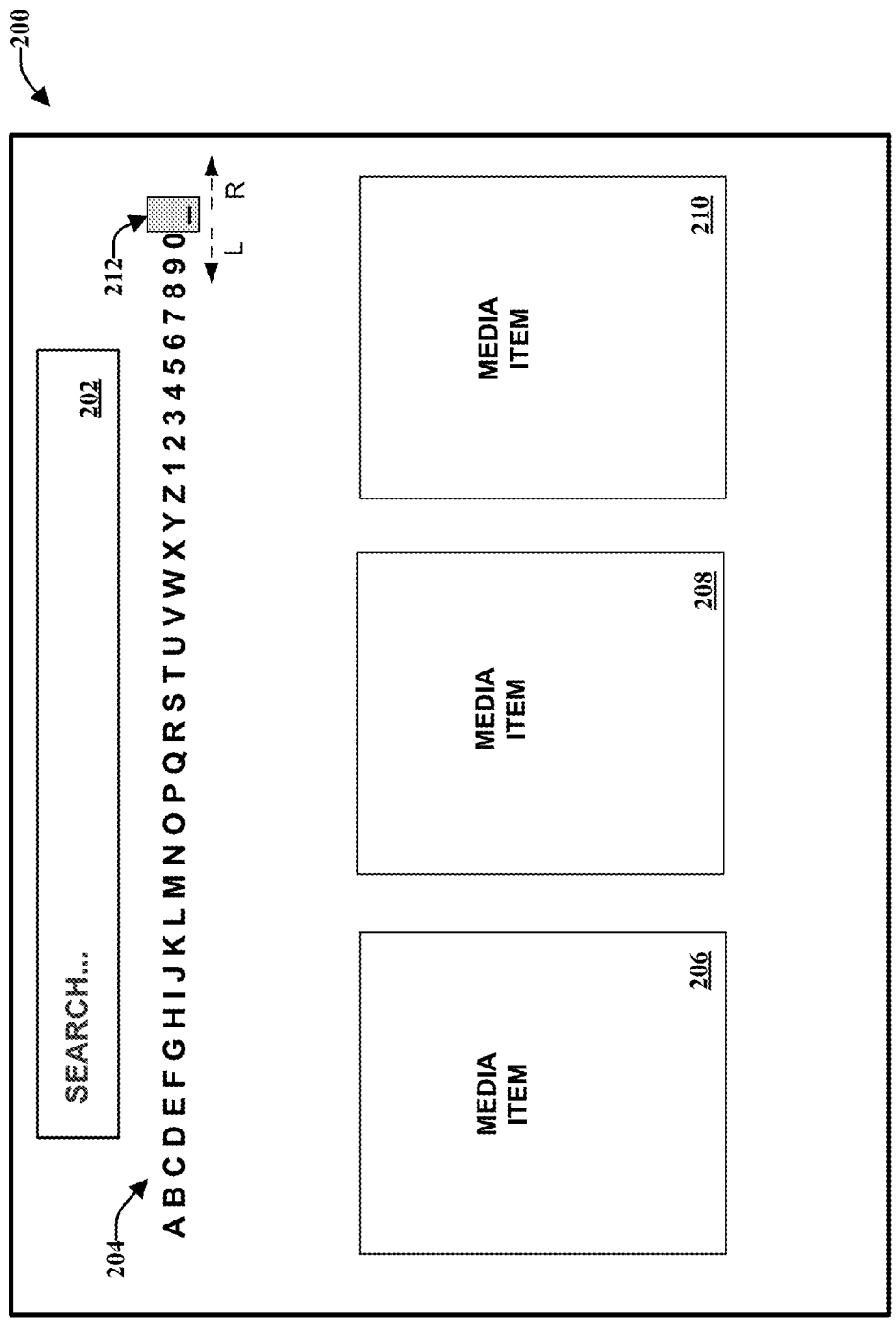
FIG. 2 illustrates a schematic representation of an example layout of a graphical input display generated by an interface component, in accordance with various aspects and embodiments described herein.

Turning now to FIG. 2, presented is an example graphical user interface 200 generated by interfacing platform 102 that facilitates efficient character input. Repetitive description of like elements employed in respective embodiments of systems and interfaces described herein are omitted for sake of brevity. Interface 200 facilitates character input when searching for data, particularly media items available by a streaming media system.

Interface 200 depicts a possible view of a graphical user interface applied for interaction with a streaming media system at an initial entry point to the streaming media system (e.g., prior to entering a search query term or phrase). Interface 200 includes a character carousel 204, a search box 202 and media items 206, 208 and 210. Media items 206, 208 and 210 for example can include thumbnails of videos available for streaming by a streaming media system. Interface 200 can be employed to search for specific media items for viewing. In an aspect, as a user inputs characters into the search box 202, the media items presented therebelow can be automatically updated to reflect the input characters. When a user has not input any characters into the search box, the particular media items 206-210 presented to a user can be determined randomly or by alternative mechanisms (e.g., currently popular media items, recently viewed media items by the user, and etc.).

Interface 200 is designed to facilitate efficient character input using a basic controller having a direction pad, an enter/select button and a cancel button. The character carousel 204 can be employed to select character for typing into the search box 202 in order to generate a word or phrase against which to issue a search query. The carousel 204 consists of a plurality of letters, numbers and a space character arranged in a fixed horizontal line above the displayed media items 206-208. The carousel 204 can include a cursor/indicator 212 that can be controlled with a direction pad of a controller to move over the characters of the carousel such that the cursor rests on a single character at time. In particular, a user can press a left button or a right button on a controller to move the cursor 212 in the left direction (represented by arrow "L") or the right direction (represented by arrow "R") respectively over the characters.

In an aspect, the cursor 212 can loop endlessly around the characters. More precisely, the cursor 212 can be moved over the characters in the left direction or the right direction such that the cursor shifts from a first end of the line (e.g., the end at which the cursor is depicted in interface 200 at the space bar character) to a second end of the line (e.g., the end of the line beginning with the letter A) in response to reaching either the first end of the line or the second end of the line. In other words, when looking at interface 200, if a user were to press a right button, the cursor 212 would shift positions to hover over the "A" character of the carousel. Similarly, after the cursor 212 is positioned over the "A" character, if the user were to press a left button, the cursor 212 would move back to the position over the space bar.

Figure 3:
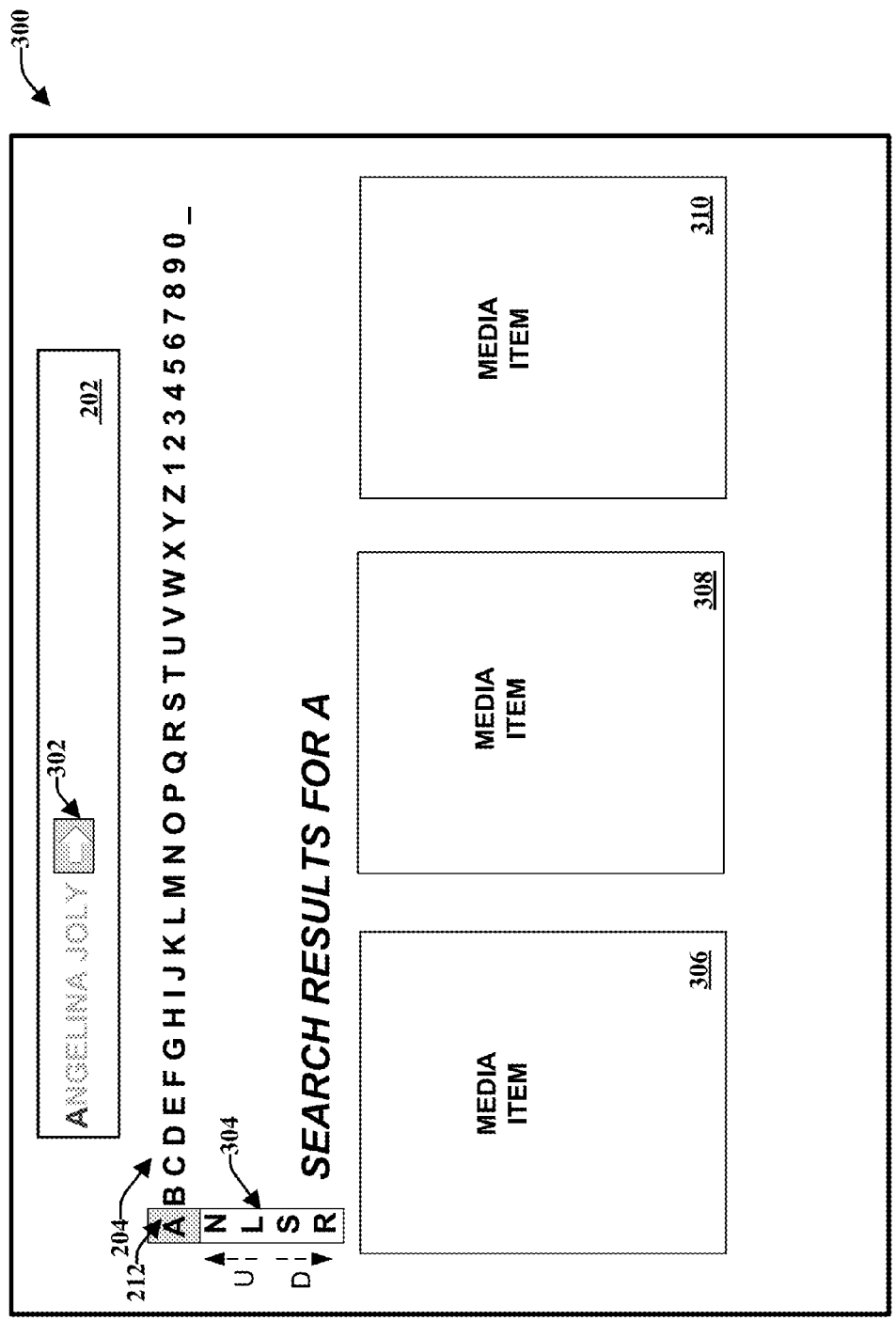
FIG. 3 illustrates a schematic representation of another example layout of a graphical input display generated by an interface component, in accordance with various aspects and embodiments described herein.

Referring now to FIG. 3 presented is an example graphical user interface 300 generated by interfacing platform 102 that facilitates efficient character input. Repetitive description of like elements employed in respective embodiments of systems and interfaces described herein are omitted for sake of brevity.

Interface 300 is an extension of interface 200 wherein a user has interacted with interface 200 to select character "A." For example, when moving from interface 200 to interface 300, a user has moved cursor 212 to hover over character "A" using the left button or the right button of a direction pad controller. The user has further selected the "A" character by pressing an enter button on the controller. It should be appreciated that such input commands initiated by a user are received and effectuated by an input component (e.g., input component 118). As seen in the search box 202, selection of the "A" character results in the typing of the letter "A" into the search box.

The search box 202 is further populated with a suggested word/phrase (e.g., "Angelina Joly"). The suggested word or phrase is based on the typed letter "A" and determined or inferred by an analysis component (e.g., analysis component 110) to be a possible search term that the user may be interested in issuing a query against. The suggested word or phrase is further followed by a search widget 302 within the search box 202. In an aspect, in order to move from attention/focus from the character carousel to the search box, the user can press an up button or a combination of an up button and the selection button (e.g. or any other suitable button or button combination). Once attention has been shifted to the search box 202, by pressing the enter/select button, the user can accept the suggested query and select the search widget 302 to initiate a query search based on the suggested term. Further, media items 306, 308 and 310 can be updated/changed from the previously presented media items 206, 208 and 210 to reflect search results associated with the letter "A."

In addition, in response to selection of the letter "A" the interface component has generated a secondary drop down graphical display 304 having suggested characters based on the selected character "A." For example, the suggested characters "N, L, S and R," can be determined by an analysis component (e.g., analysis component 110) as characters that often follow the letter "A." The user can further scroll through the drop down display using up and down keys of a controller to select one of the suggested characters. In an aspect, although not depicted, rather than suggested characters, the secondary display 304 can include a scrollable list of suggested words based on the selected character "A."

Figure 4:
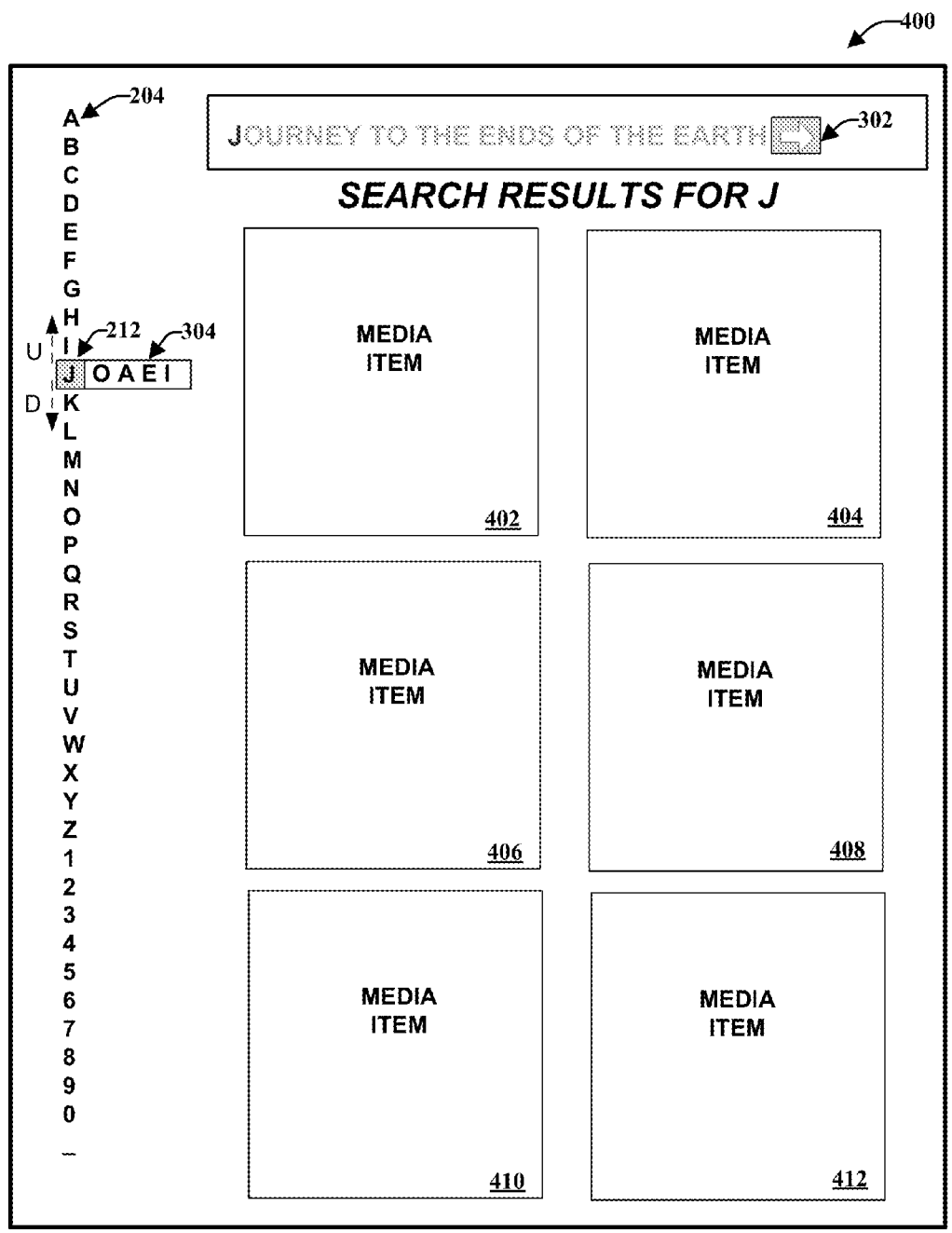
FIG. 4 illustrates a schematic representation of another example layout of a graphical input display generated by an interface component, in accordance with various aspects and embodiments described herein.

FIG. 4 illustrates another example graphical user interface 400 generated by interfacing platform 102 that facilitates efficient character input. Repetitive description of like elements employed in respective embodiments of systems and interfaces described herein are omitted for sake of brevity.

Interface 400 includes similar elements from interfaces 200 and 300. Interface 400 differs from interfaces 200 and 300 merely in the arrangement and position of the various elements of the interface about a display screen. For example, an adaptation component (e.g., adaptation component 108), can generate interface 400 as opposed to interface 300 as a function of an orientation and/or dimension of a display screen of a client device at which the interface 400 is presented.

As seen in interface 400, the character carousel 204 is arranged in a vertical line as opposed to a horizontal line. With this configuration, in order to move the cursor 212 about the carousel, a user can employ the up and down keys of a controller. After selection of a character, the interface component (e.g., interface component 104) can generate a tangential secondary graphical display 304 having suggested characters based on the selected character. The user can scroll through the horizontal display 304 using left and right buttons of a controller.

For example, as depicted in interface 400, a user has selected the letter "J." In response to selection of the letter "J," the interface component has generated a horizontal secondary display menu 304 that extends perpendicular from the selected letter "J," and include suggested letters "O, A, E, and I." The search box is further populated with a search term "Journey to the ends of the earth," based on the typed letter "J." In addition, media items 402, 404, 406, 408, 410 and 412 can be arranged adjacent to the character carousel and below the search box 202. The media items 402-412 can be updated to reflect search results for the letter "J." In an aspect, although not depicted, rather than suggested characters, the secondary display 304 can include a scrollable list of suggested words based on the selected character "J."

Figure 5:
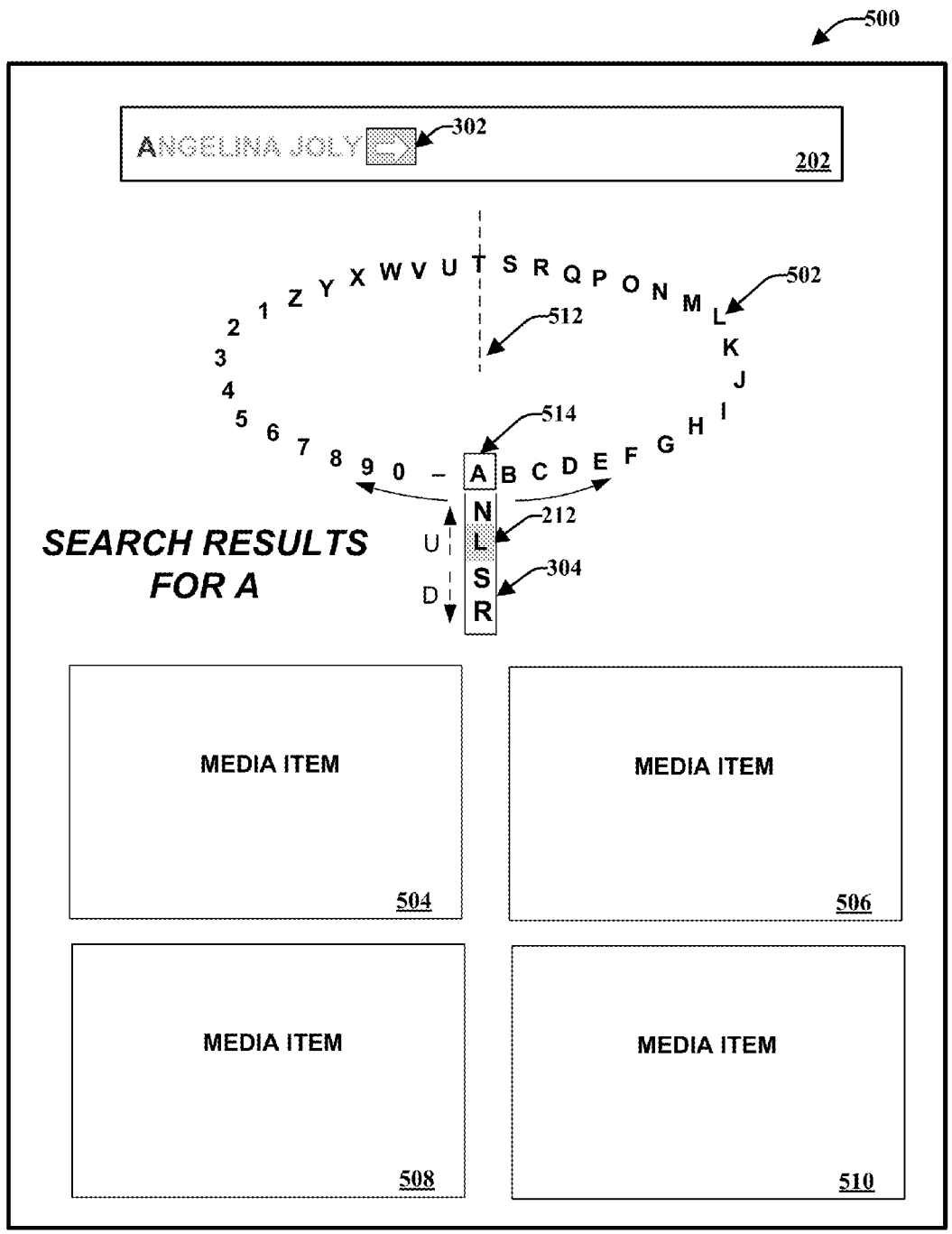
FIG. 5 illustrates a schematic representation of another example layout of a graphical input display generated by an interface component, in accordance with various aspects and embodiments described herein.

FIG. 5, illustrates another example graphical user interface 500 generated by interfacing platform 102 that facilitates efficient character input. Repetitive description of like elements employed in respective embodiments of systems and interfaces described herein are omitted for sake of brevity.

Interface 500 includes same or similar elements from interfaces 200, 300 and 400. Interface 400 differs from interfaces 200-400 with respect to the configuration of the character carousel. In particular, interface 500 includes a character carousel 502 having a plurality of characters arranged in a circle. In an aspect, the character carousel 502 is a two-dimensional circular arrangement of characters. In another aspect, the character carousel can be a three-dimensional circular arrangement of characters. In an aspect, the letters of the character carousel 502 are configured to rotate around an axis 512 about the circle clockwise or counter clockwise such that a single one of the plurality of characters passes though a fixed focus position 514 at a time. In order to rotate the characters clockwise, a user can press a left key on a direction pad of a controller and in order to move the characters counter-clockwise, the user can press a right key on a direction pad of a controller.

According to this aspect, the cursor 212 can rest at the focus position 514 and does not move around the carousel of characters. However, similar to interface 300, in response to selection of a character brought to the focus position 514, the interface component can generate a secondary drop down graphical display 304 having suggested characters based on selected characters. The user can navigate the drop down display using the up and down keys of a controller. For example, in interface 500, a user has selected the character "A." In response to selection of the "A" character, the "A" character is typed in the search box 202 and the search box is populated with a suggested search term based on the letter "A." The media items present below the character carousel 502, media items 504, 506, 508 and 510, are further updated to reflect search results for the letter "A." In addition, in response to selection of the "A" character, the interface component generates a drop down graphical display 304 having suggested characters based on the "A" character. The user has further moved the cursor 512 down to the letter "L." In an aspect, although not depicted, rather than suggested characters, the secondary display 304 can include a scrollable list of suggested words based on the selected character "A."

In another embodiment, rather than rotation of the characters of the carousel, the cursor 512 can rotate around the circle of characters to focus on a single character at a time. According to this aspect, in response to selection of a character, the interface component can generate a secondary graphical input display of suggested characters extending tangentially from the selected character.

Figure 6:
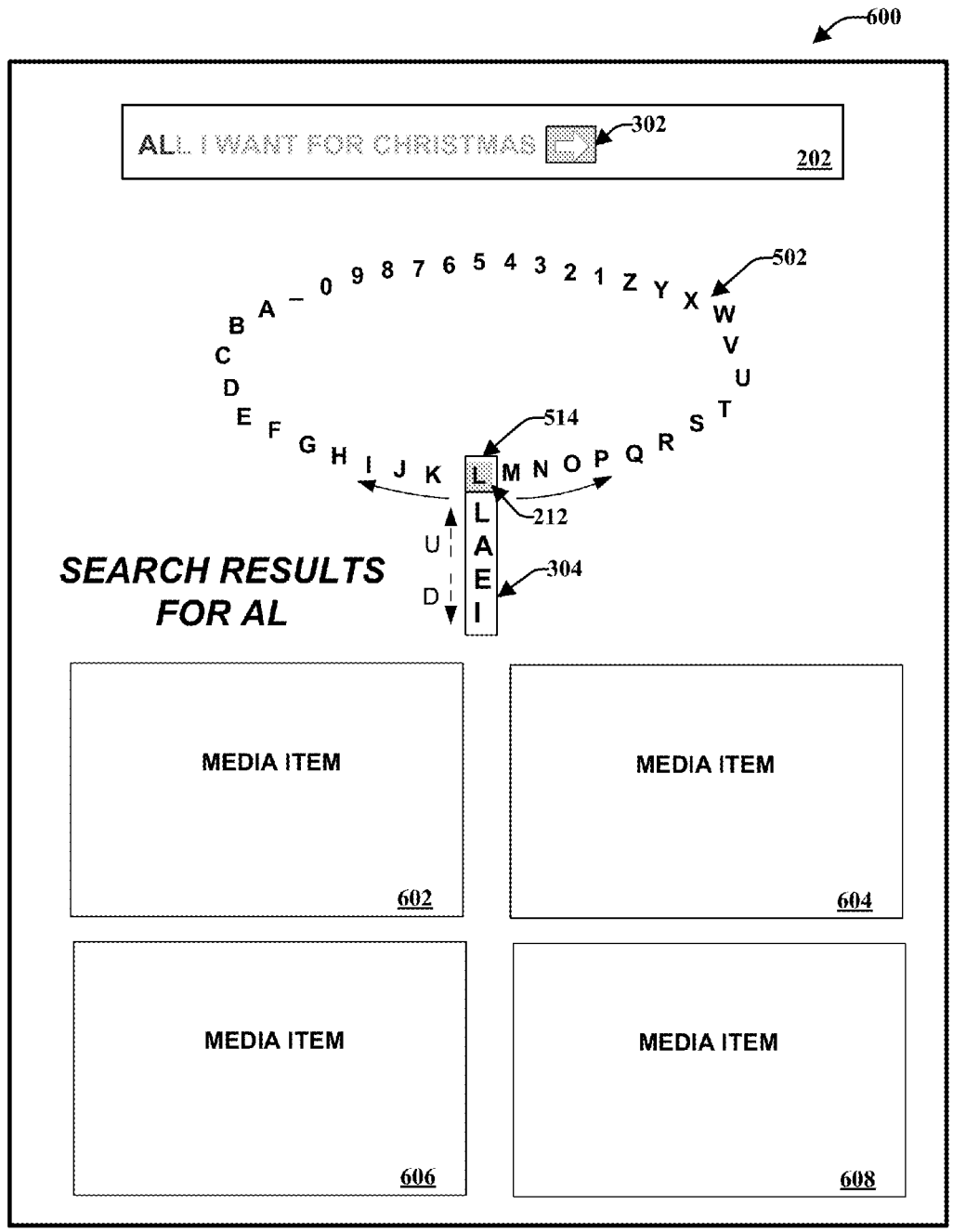
FIG. 6 illustrates a schematic representation of another example layout of a graphical input display generated by an interface component, in accordance with various aspects and embodiments described herein.

FIG. 6 presents an example graphical user interface 600 generated by interfacing platform 102 that facilitates efficient character input. Repetitive description of like elements employed in respective embodiments of systems and interfaces described herein are omitted for sake of brevity.

Interface 600 is an extension of interface 500 wherein a user has interacted with interface 500 to select character "L" from the secondary drop down graphical display 304. As seen in interface 600, in response to selection of the "L" character, the interface component updates the configuration/orientation of the character carousel 502 so that the letter "L" on the character carousel is placed at the focus position 514. The interface component further generates a new secondary drop down vertical display 304 with suggested characters based on the letter "L." The cursor 212 is rested initially within the focus position 514. From this point, a user can press the left or right buttons of a controller to rotate the characters clockwise and counter-clockwise respectively and/or press the up/down buttons of the controller to scroll through the suggested letters of the drop down vertical display 304. In an aspect, in response to choosing to rotate the characters clockwise or counter-clockwise, the secondary drop down vertical display 304 is removed.

In addition, after selection of the "L" character, the "L" character is typed aside the "A" character within the search box 202. The search component further updates the suggested search term in the search box to based on the combined letters "A" followed by "L." (e.g., the new suggested search term has become "All I want for Christmas"). Further, the media items presented below the character carousel (e.g., items 602, 604, 606, and 608) are updated to reflect search results for the combined letters "AL."

Figure 7:
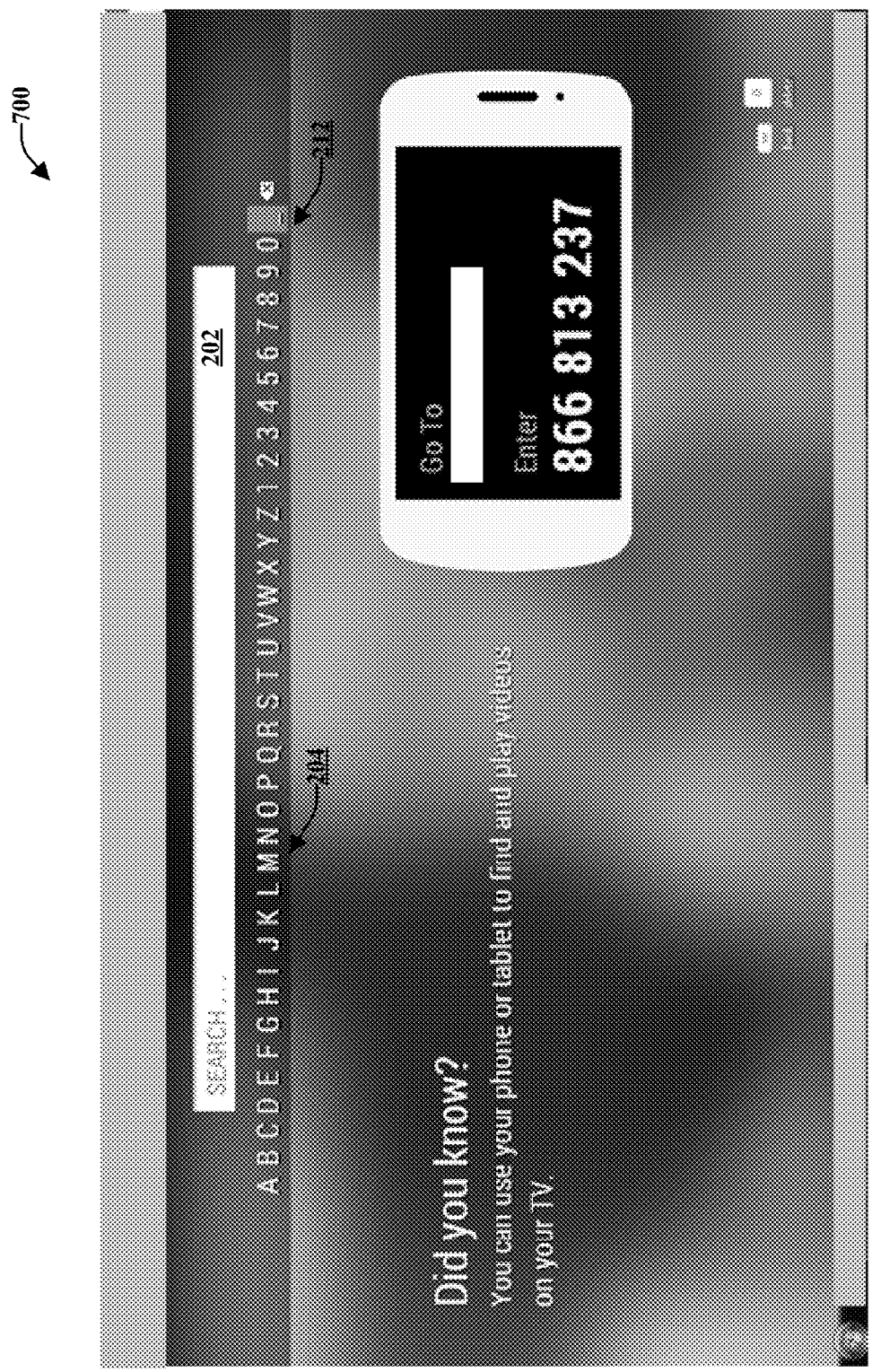
FIG. 7 illustrates a schematic representation of another example layout of a graphical input display generated by an interface component, in accordance with various aspects and embodiments described herein.

Turning now to FIG. 7, presented is an example layout of graphical user interface 700 generated by interfacing platform 102 that facilitates efficient character input. Repetitive description of like elements employed in respective embodiments of systems and interfaces described herein are omitted for sake of brevity. Interface 700 depicts a possible view of a graphical user interface applied for interaction with a streaming media system at an initial entry point to the streaming media system (e.g., prior to entering a search query term or phrase). Interface 700 includes a horizontal character carousel 204, a search box 202. The cursor 212 can be moved about the character carousel in the manners discussed with reference to interfaces 200-300.

Figure 8:
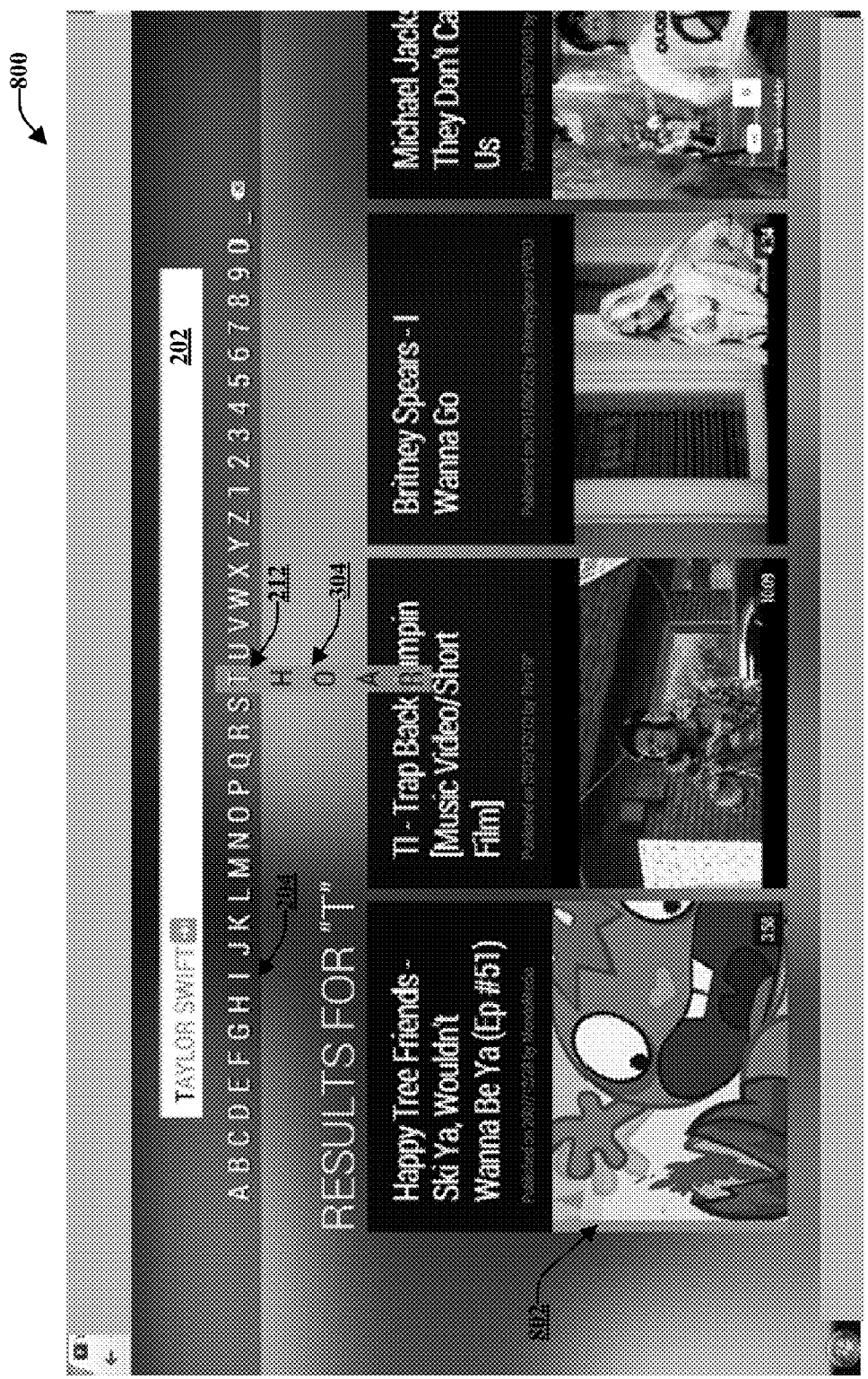
FIG. 8 illustrates a schematic representation of another example layout of a graphical input display generated by an interface component, in accordance with various aspects and embodiments described herein.

FIG. 8 presents an example graphical user interface 800 generated by interfacing platform 102 that facilitates efficient character input. Repetitive description of like elements employed in respective embodiments of systems and interfaces described herein are omitted for sake of brevity. Interface 800 is an extension of interface 700 wherein a user has interacted with interface 700 to move the cursor 212 to select character "T."

As seen in interface 800, in response to selection of the character T, the input component causes the letter "T" to be typed in to the search box 202. The search component further populates the search box with a suggested search term, "Taylor Swift," using the analysis component (e.g., analysis component 110). The selected term "T" is typed in black while the remaining letters of the suggested search term are greyed out. In an aspect, in order to accept the suggested search term, a user can press an up key, a combination of keys or another predetermined key, to shift focus from the character carousel to the search box 202. After focus is shifted to the search box 202, the user can press an enter key to issue a query against the suggested search term.

In addition, in response to selection of the letter "T," the interface component can display search results of media items for the letter "T." For example, the interface component can display thumbnails 802 of videos based on a search under the letter "T." In an aspect, a user can employ various buttons on a controller (such as a down button or combination of a down button with another button) to change focus to the thumbnails 802 of the search results. The user can further scan through the thumbnails 802 using left and right keys of a controller.

Further, in response to selection of the letter "T," the interface component generates a secondary drop-down vertical display 304 having suggested characters based on the letter "T." The user can scroll through the suggested letters using up and down keys of the controller. In an aspect, the drop-down vertical display 304 is an overlay feature wherein the drop-down vertical display is overlaid onto other features (e.g., thumbnails . . . ).

Figure 9:
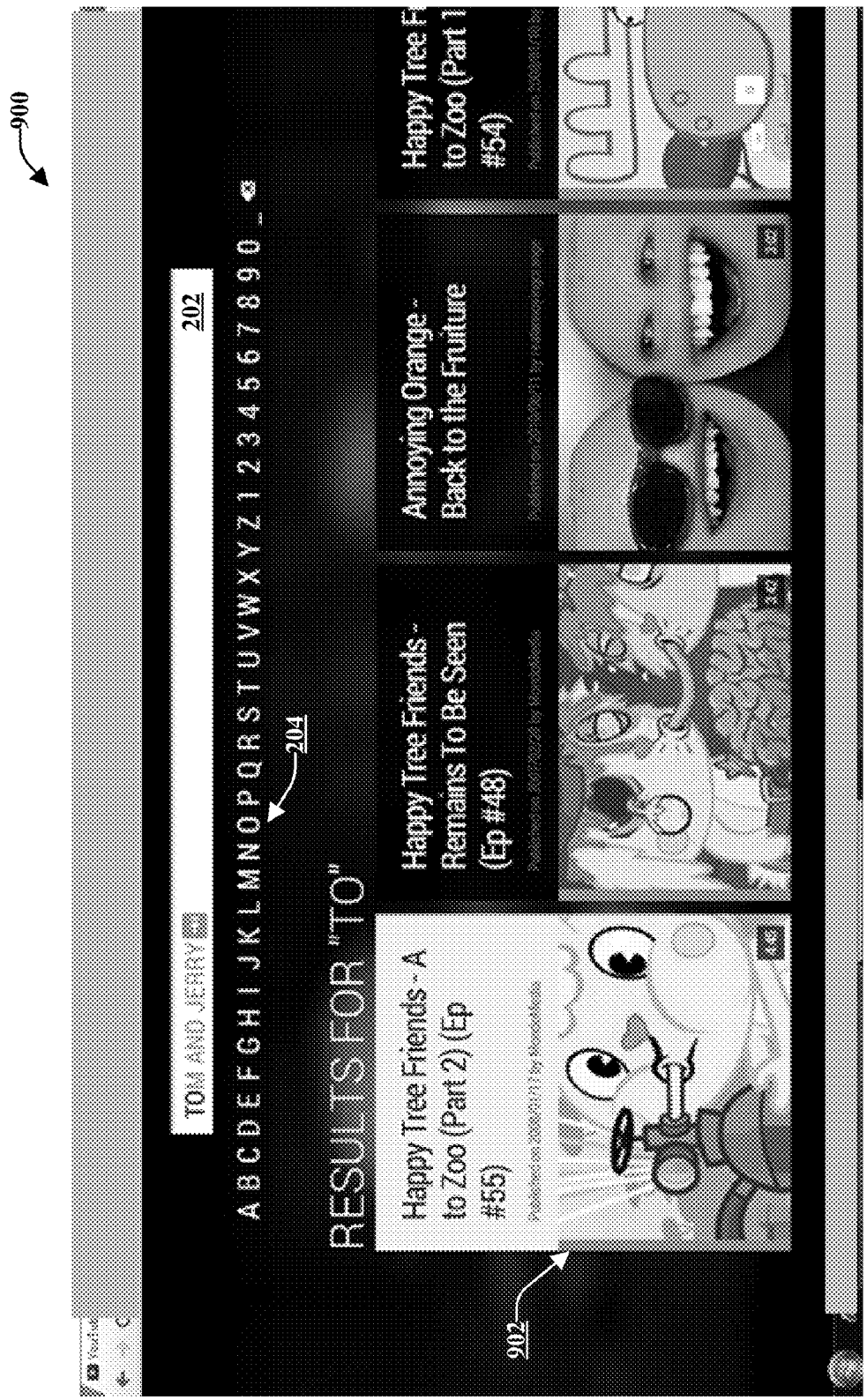
FIG. 9 illustrates a schematic representation of another example layout of a graphical input display generated by an interface component, in accordance with various aspects and embodiments described herein.

FIG. 9 presents an example graphical user interface 900 generated by interfacing platform 102 that facilitates efficient character input. Repetitive description of like elements employed in respective embodiments of systems and interfaces described herein are omitted for sake of brevity. Interface 900 is an extension of interface 800 wherein a user has interacted with interface 800 to move the cursor 212 down the drop-down vertical display 304 of interface 800 to select character "O." As seen in interface 900, in response to selection of the character "O" the letter "O" is typed aside the letter "T" in the search box 202 and the search component populates the search box with a new suggested term "Tom and Jerry" based on the combined letter "T" followed by "O." In addition, the interface component updates the search results to present thumbnails of videos 902 that reflect a search based on the letters "TO."

Figure 10:
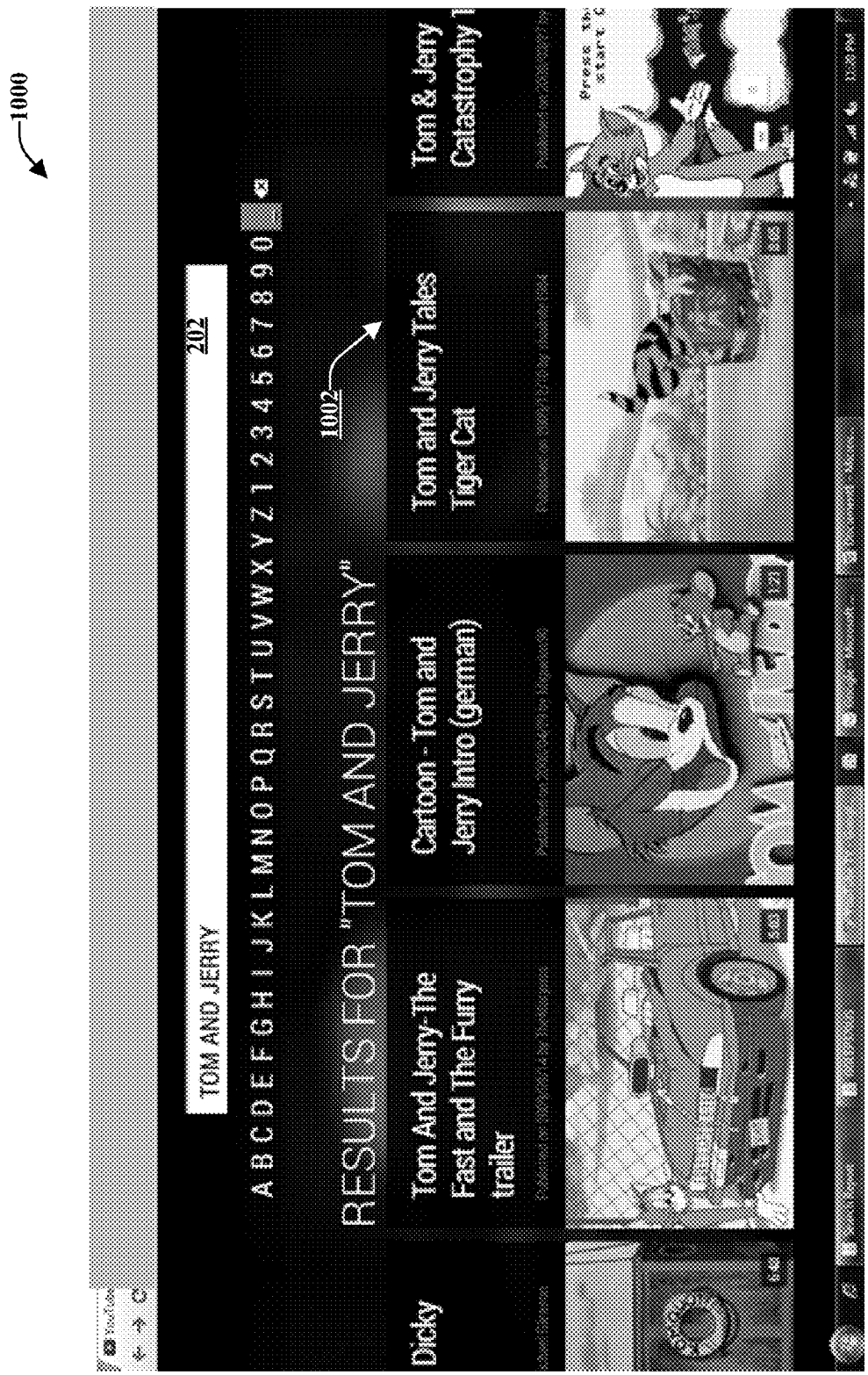
FIG. 10 illustrates a schematic representation of another example layout of a graphical input display generated by an interface component, in accordance with various aspects and embodiments described herein.

FIG. 10 presents an example graphical user interface 1000 generated by interfacing platform 102 that facilitates efficient character input. Repetitive description of like elements employed in respective embodiments of systems and interfaces described herein are omitted for sake of brevity. Interface 1000 is an extension of interface 900 wherein a user has interacted with interface 900 to accept the suggested search term "Tom and Jerry." As seen in interface 1000, in response to selection of the search term "Tom and Jerry" the interface component updates the search results to present thumbnails of videos 1002 that reflect a search based on the term "Tom and Jerry."

Figure 11:
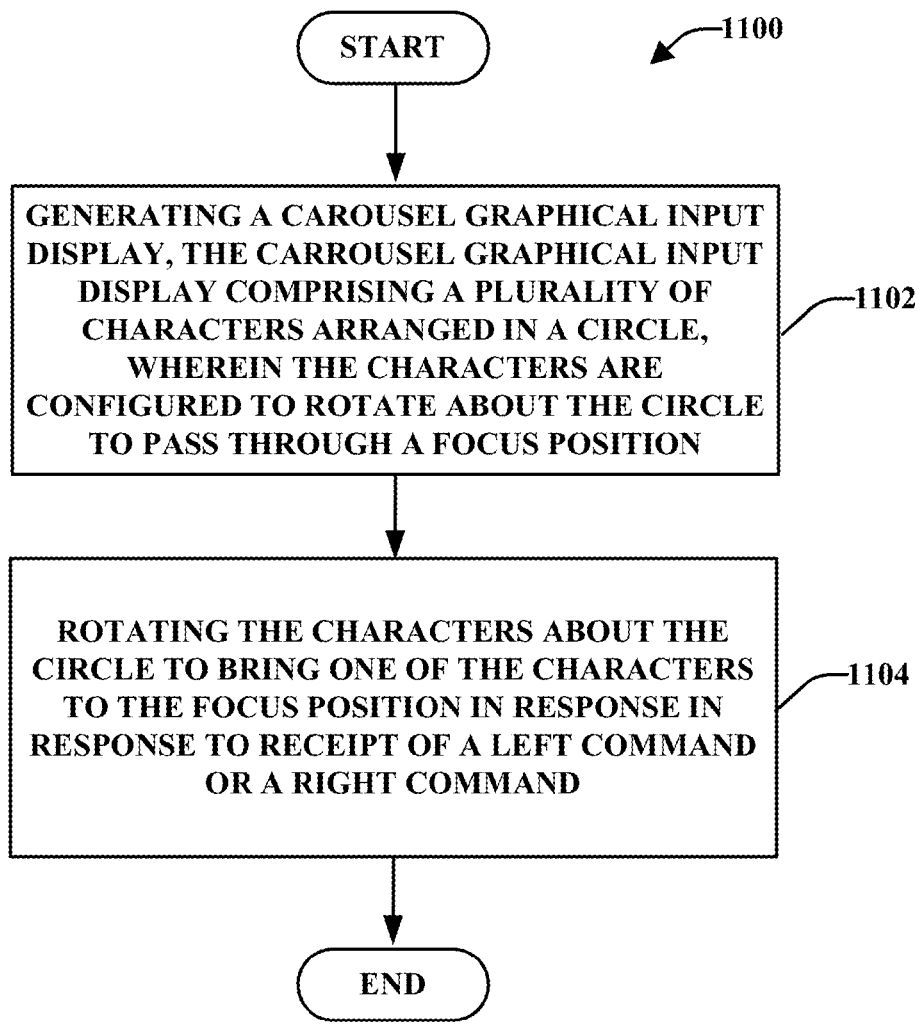
FIG. 11 is a flow diagram of an example method for facilitating character input using a graphical input display having a carousel of characters in accordance with various aspects and embodiments described herein.
Figure 12:
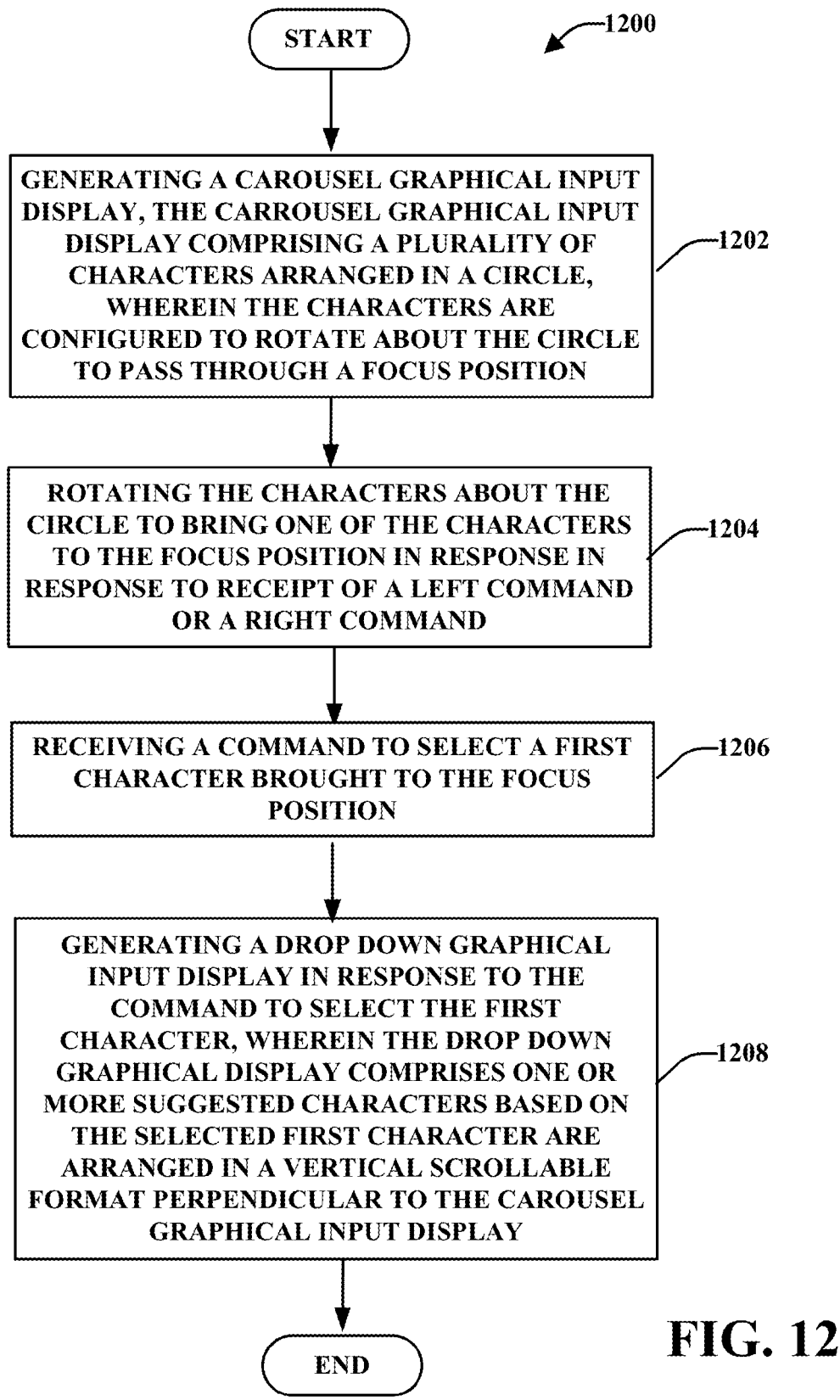
FIG. 12 is a flow diagram of another example method for facilitating character input using a graphical input display having a carousel of characters in accordance with various aspects and embodiments described herein.
Figure 13:
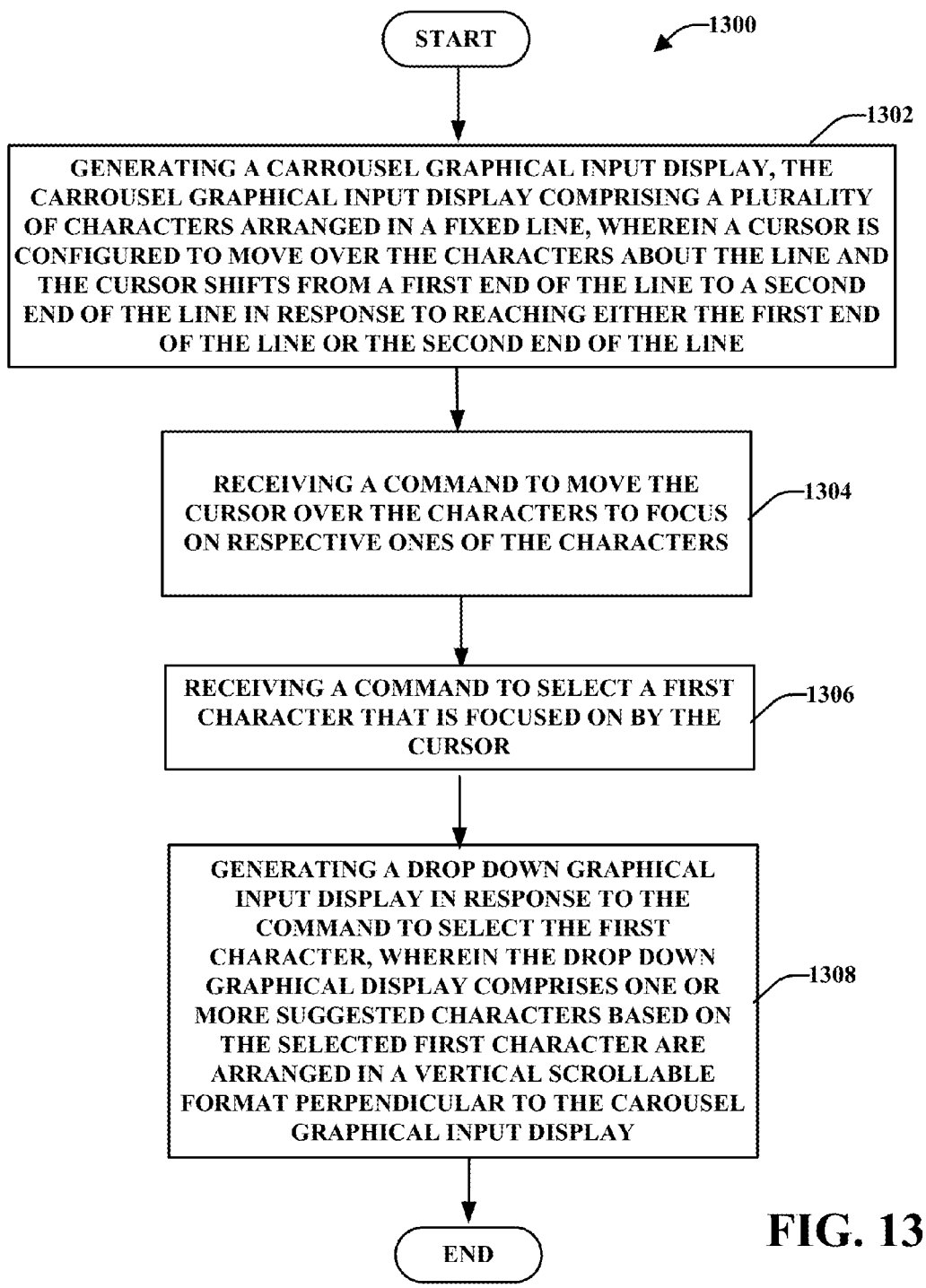
FIG. 13 is a flow diagram of another example method for facilitating character input using a graphical input display having a carousel of characters in accordance with various aspects and embodiments described herein.

In view of the example systems/interface described herein, example methods that can be implemented in accordance with the disclosed subject matter can be further appreciated with reference to flowcharts in FIGS. 11-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 11 illustrates a flow chart of an example method 1100 for inputting characters to a graphical input display using a basic controller. At 1102, a carousel graphical input display is generated (e.g., using the interface component 104). The carrousel graphical input display comprises a plurality of characters arranged in a circle, wherein the characters are configured to rotate about the circle to pass through a focus position. At 1104, a command to rotate the characters to bring one of the characters to the focus position is received (e.g., using the input component 118).

FIG. 12 illustrates another flow chart of an example method 1200 for inputting characters to a graphical input display using a basic controller. At 1202, a carousel graphical input display is generated (e.g., using the interface component 104). The carrousel graphical input display comprises a plurality of characters arranged in a circle, wherein the characters are configured to rotate about the circle to pass through a focus position. At 1204, a command to rotate the characters to bring one of the characters to the focus position is received (e.g., using the input component 118). At 1206, a command to select a first character brought to the focus position is received (e.g., using the input component 118). At 1208, a drop down graphical input display is generated in response to the command to select the first character (e.g., using the interface component 104). The drop down graphical display comprises one or more suggested characters based on the selected first character, wherein the one or more suggested characters are arranged in a vertical scrollable format.

FIG. 13 illustrates another flow chart of an example method 1300 for inputting characters to a graphical input display using a basic controller. At 1302 a carousel graphical input display is generated (e.g., using the interface component 104). The carousel graphical input display comprises a plurality of characters arranged in a fixed line, wherein a cursor is configured to move over the characters about the line and the cursor shifts from a first end of the line to a second end of the line in response to reaching either the first end of the line or the second end of the line. At 1304, a command to move the cursor over the characters to focus on respective ones of the characters is received (e.g., using the input component 118). At 1306, a command to select a first character that is focused on by the cursor is received (e.g., using the input component 118). At 1308, in response to the command to select the first character, a drop down graphical input display is generated (e.g., using the interface component 104). The drop down graphical display comprises one or more suggested characters based on the selected first character arranged in a scrollable format perpendicular to the carousel graphical input display.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 14:
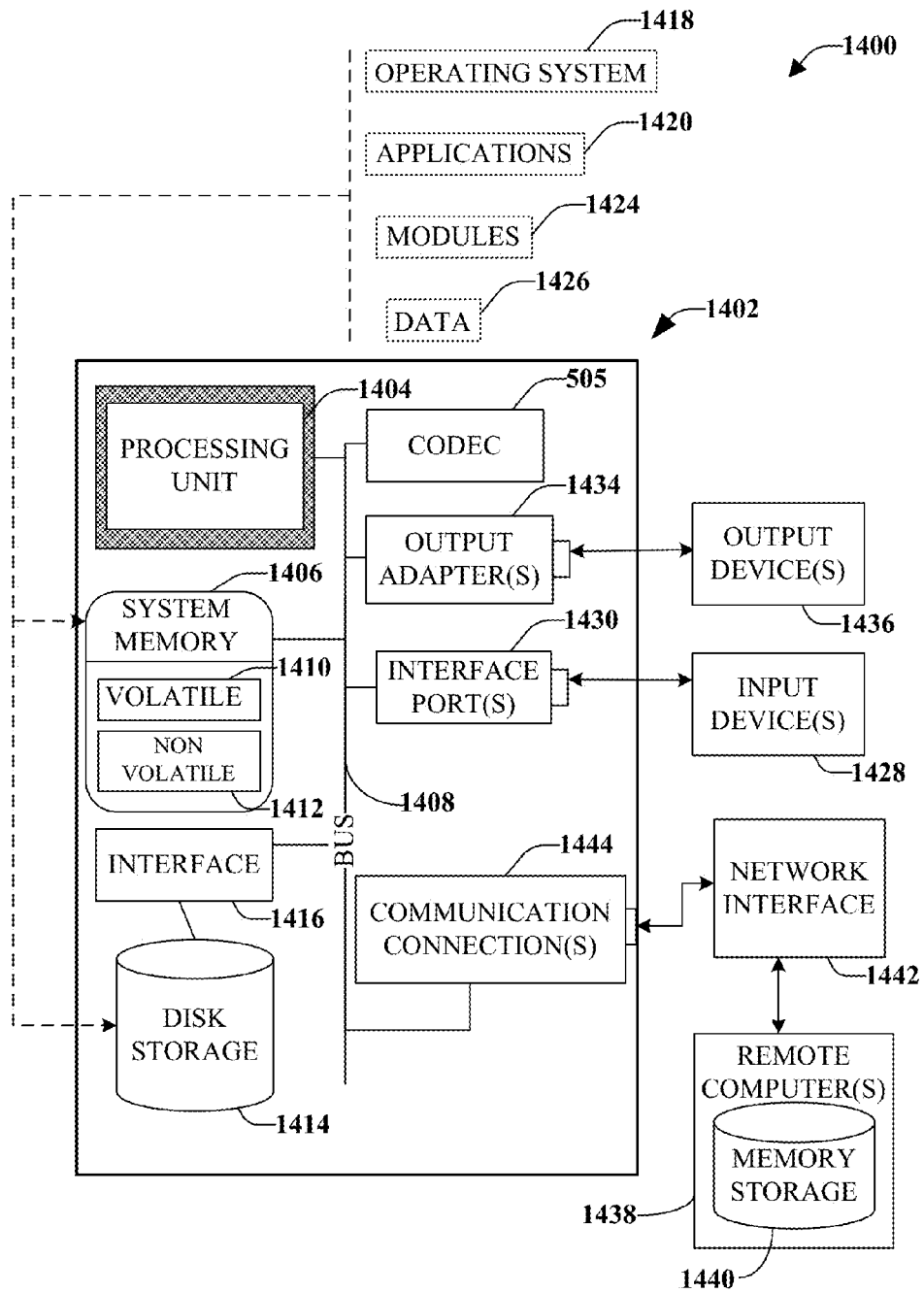
FIG. 14 is a schematic block diagram illustrating a suitable operating environment in accordance with various aspects and embodiments.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
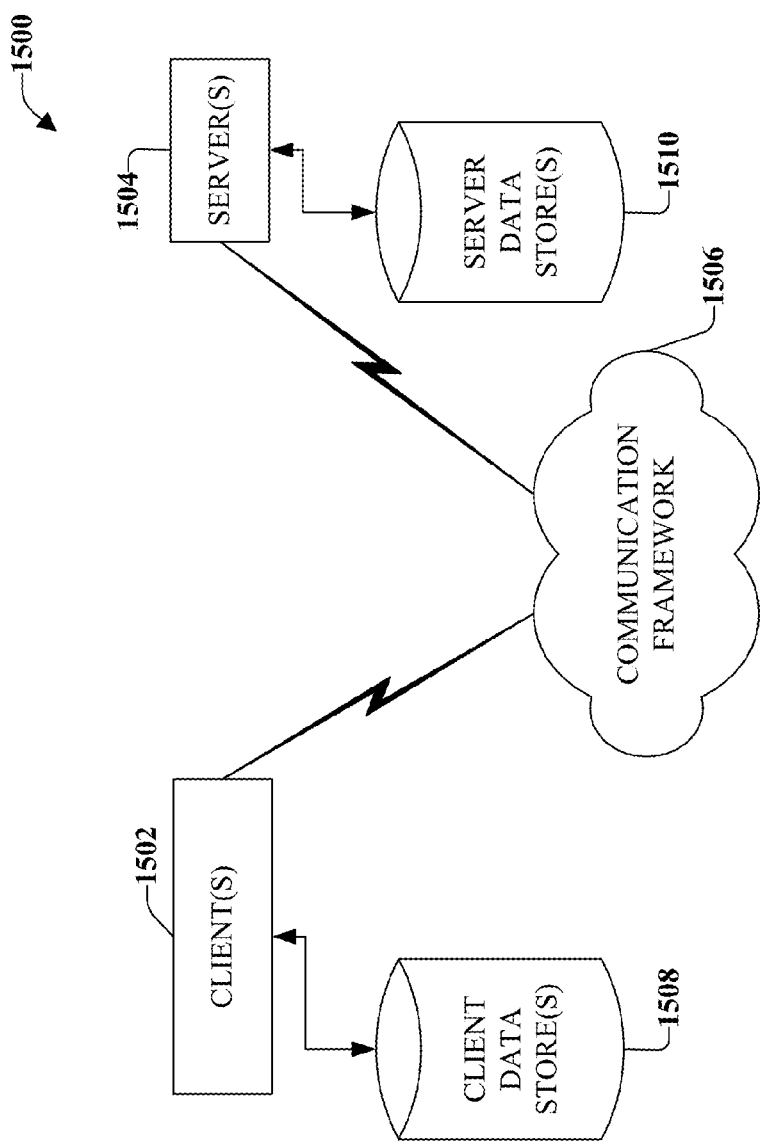
FIG. 15 is a schematic block diagram of a sample-computing environment in accordance with various aspects and embodiments.

Referring now to FIG. 15, there is illustrated a schematic block diagram of a computing environment 1500 in accordance with this disclosure. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1508 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory having stored thereon computer executable components; and
    a processor configured to execute the following computer executable components stored in the memory:
        an interface component configured to generate a carousel graphical input display, the carousel graphical input display comprising a plurality of characters arranged in a circle, wherein the characters are configured to rotate about the circle to pass through a focus position, and generate a secondary display comprising one or more single suggested next characters based on a character at the focus position and in response to selection of the character at the focus position, where each of the single suggested next characters are individually selectable; and
        an input component configured to receive a command to rotate the characters to bring one of the characters.

2. The system of claim 1, wherein the circle configured to rotate about a horizontal axis.

3. The system of claim 1, wherein the circle is configured to rotate about a vertical axis.

4. The system of claim 1, wherein the circle appears three dimensional.

5. The system of claim 1, wherein the input component is further configured to rotate the characters arranged in the circle clockwise in response to the command to rotate the characters being a right command, and rotate the characters arranged in the circle counter clockwise in response to the command to rotate the characters being a left command.

6. The system of claim 1, wherein only one of the characters can pass through the focus position at a time and the focus position is fixed.

7. The system of claim 1, wherein the secondary display is arranged in a format orthogonal to the circle.

8. The system of claim 1, wherein the secondary display is a drop down vertical list comprising the one or more single suggested next characters in scrollable format tangential from a selected character at the focus position.

9. The system of claim 1, wherein a character of the one or more single suggested next characters can be selected by moving a cursor from a selected character at the focus position over the one or more single suggested next characters.

10. The system of claim 9, wherein the interface component is configured to rotate the carousel graphical input display in response to selection of a single suggested next character from the one or more single suggested next characters to place a version of the suggested character at the focus position of the carousel graphical input display.

11. The system of claim 9, wherein the interface component is configured to dismiss the secondary display in response to selection of a single suggested next character from the one or more suggested characters.

12. The system of claim 1, wherein the interface component is further configured to generate a graphical text box display, wherein input component is configured to type selected characters in the graphical text box display.

13. The system of claim 12, further comprising an analysis component configured to infer the one or more single suggested next characters based on the character at the focus position in response to selection of the character and a previously selected character typed in the graphical text box display.

14. The system of claim 12, further comprising an analysis component configured to infer one or more suggested words based on a selected character typed in the graphical text box display and wherein the input component is configured to type the one or more suggested words in the graphical text box display adjacent to the selected character typed in the graphical text box display.

15. A system, comprising:
a memory having stored thereon computer executable components; and
a processor configured to execute the following computer executable components stored in the memory:
an interface component configured to generate a carousel graphical input display, the carousel graphical input display comprising a plurality of characters arranged in a fixed line and having a cursor configured to move over the characters about the line to focus on a single character of the plurality of characters at a time, wherein the curser is configured to shift from a first end of the line to a second end of the line in response to reaching either the first end of the line or the second end of the line, and generate a secondary display comprising one or more single suggested next characters based on a character over which the cursor is focused and in response to selection of the character over which the cursor is focused, where each of the single suggested next characters are individually selectable; and
an input component configured to receive commands to move the cursor over the plurality of characters and receive commands to select characters of the plurality of characters.

16. The system of claim 15, wherein the secondary display is arranged in a format orthogonal to the line and comprises a list of the one or more single suggested next characters in scrollable format tangential from a focused character, and a character of the one or more single suggested next characters can be selected by moving the cursor from a focused character over the one or more single suggested next characters.

17. The system of claim 16, wherein the interface component is configured to dismiss the secondary display in response to selection of a single suggested next character from the one or more single suggested next characters and position the cursor over a version of the selected single suggested next character on the carousel graphical input display.

18. The system of claim 17, wherein the interface component is further configured to generate a graphical text box display, wherein input component is configured to type selected characters in the graphical text box display.

19. A method comprising:
generating, by a system including a processor, a carousel graphical input display, the carrousel graphical input display comprising a plurality of characters arranged in a circle, wherein the characters are configured to rotate about the circle to pass through a focus position;
rotating, by the system, the characters about the circle to bring a first character of the plurality of characters to the focus position in response in response to receipt of a left command or a right command; and
generating, by the system, a secondary display comprising one or more single suggested next characters based on the first character and in response to selection of the first character, where each of the single suggested next characters are individually selectable.

20. The method of claim 19, further comprising:
receiving a command to select a suggested character of the one or more suggested characters and in response:
typing the single suggested next character in a text box;
dismissing the secondary display; and
rotating the characters about the circle to bring a version of the single suggested next character on the carousel graphical input display to the focus position.

21. A method comprising:
generating, by a system including a processor, a carousel graphical input display, the carrousel graphical input display comprising a plurality of characters arranged in a fixed line and comprising a cursor configured to move over the plurality characters about the line to focus on a single character of the plurality of characters at a time, wherein the curser is configured to shift from a first end of the line to a second end of the line in response to reaching either the first end of the line or the second end of the line;
moving, by the system, the cursor over the plurality of characters to focus on a first character of the plurality of characters; and
generating, by the system, a secondary display comprising one or more single suggested next characters based on the first character and in response to selection of the first character, where each of the single suggested next characters are individually selectable.

22. The method of claim 21, further comprising:
receiving, by the system, a command to select a suggested character of the one or more suggested characters and in response:
typing, by the system, the single suggested next character in a text box;
dismissing, by the system, the secondary display; and
moving, by the system, the cursor over the plurality of characters to focus on a version of the single suggested next character on the carousel graphical input display.

* * * * *